United States Patent [19]

Bartholet

[11] Patent Number: 4,511,011

[45] Date of Patent: Apr. 16, 1985

[54] LEG MECHANISM FOR WALKING MACHINE

[75] Inventor: Stephen J. Bartholet, Orange, Calif.

[73] Assignee: Odetics, Inc., Anaheim, Calif.

[21] Appl. No.: 476,558

[22] Filed: Mar. 18, 1983

[51] Int. Cl.³ .............................................. B62D 57/02
[52] U.S. Cl. ........................................... 180/8.6; 305/3
[58] Field of Search .................. 180/8.6, 8.1, 8.3, 8.4, 180/8.5; 305/1, 3; 280/1.167

[56] References Cited

U.S. PATENT DOCUMENTS 4,202,423  5/1980  Soto ....................................... 180/8.6
4,462,476  7/1984  Shkolnik ............................... 180/8.6

FOREIGN PATENT DOCUMENTS 53-36867  5/1978  Japan ..................................... 180/8.1

Primary Examiner—John A. Pekar
Attorney, Agent, or Firm—Spensley Horn Jubas & Lubitz

[57] ABSTRACT

A leg mechanism for a walking machine including a plurality of links arranged in a pantograph mechanism, which links are able to fold past each other so that the legs can tuck in close to the body, permitting a machine to which such legs are attached to have a small profile so that it can maneuver in areas that are as small as a human being can maneuver in.

6 Claims, 8 Drawing Figures

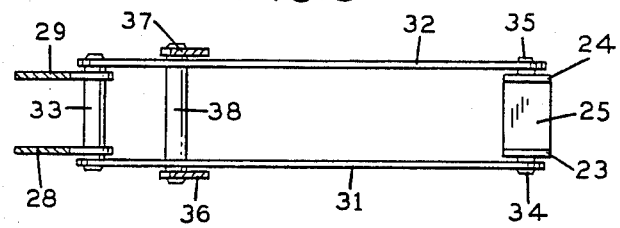
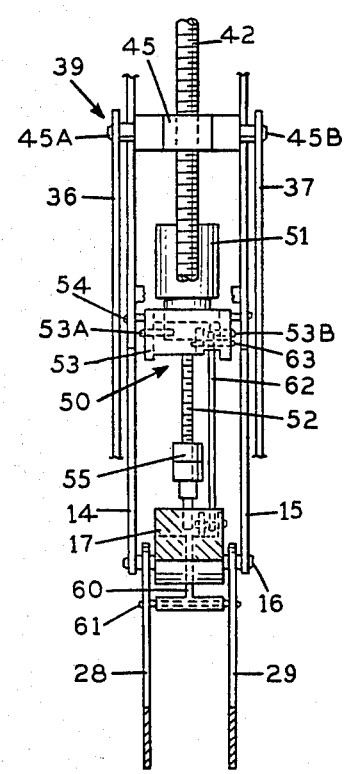
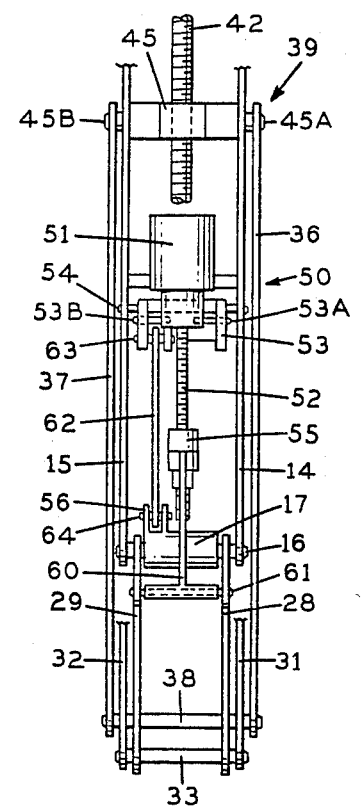

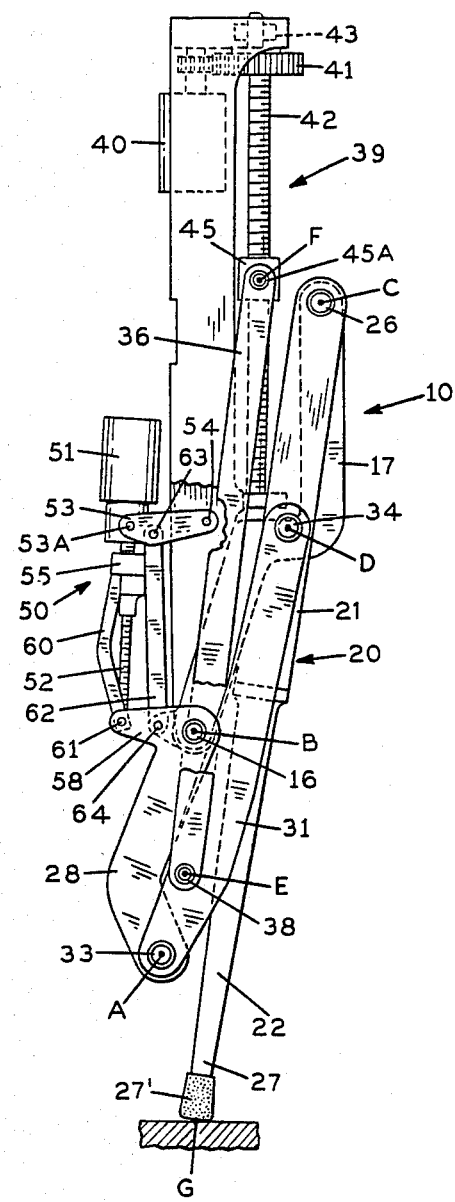

LEG MECHANISM FOR WALKING MACHINE

BACKGROUND OF THE INVENTION

1. Field of the Invention

The present invention relates to a leg mechanism for a walking machine and, more particularly, to a foldable leg mechanism which will allow the legs of a walking machine to fold compactly against the machine body.

2. Description of the Prior Art

It has long been known that it would be advantageous to develop a machine that walks rather than one driven by wheels or treads because a machine with legs can operate in areas and on terrain where wheeled or treaded vehicles cannot go. Knowing this, numerous attempts have been made over the years to develop a walking machine. However, the problems in developing such a machine have been so formidable that to this time, no satisfactory machine exists. These problems include coordinating the movement of the various legs, teaching the machine how to sense its environment so that each foot lands properly, and teaching the machine balance so that it does not fall over. The simple fact of the matter is that while walking is second nature to people and animals, it is extremely complex for computers and robots.

The computer, with its ability to process enormous amounts of data and actuate suitable commands, promises to make the control of the legs of a walking machine a manageable problem. As a result, a number of researchers around the world have been working on the development of various different types of walking machines.

In copending application Ser. No. 476,629, filed concurrently herewith, entitled Walking Machine, and assigned to Odetics, Inc., the assignee of the present application, there is disclosed a walking machine including a body having six legs attached thereto, extending therearound, in uniform positions around the body. As disclosed in such application, by arranging a walking machine with a body and six uniformly spaced legs, the machine has the ability to maneuver in areas that are as small as a human being can maneuver in. However, in order to achieve this objective, it is necessary that each leg have the capability of being pulled in quite closely to the body, with the leg actually folding into itself. A mechanism for doing this has been unknown heretofore.

In copending application Ser. No. 476,583, filed concurrently herewith, entitled Vertical Actuator Mechanism for the Legs of a Walking Machine, and assigned to Odetics, Inc., the assignee of the present application, there is disclosed the basic details of a leg mechanism for a walking machine incorporating the concept of a pantograph which achieves isolation between the mechanisms which drive the machine foot horizontally and vertically. That application does not, however, teach the manner of forming a leg mechanism from such a pantograph structure.

SUMMARY OF THE INVENTION

According to the present invention, there is disclosed a leg mechanism for a walking machine including a plurality of links arranged in a pantograph mechanism, which links are able to fold past each other so that the legs can tuck in close to the body, permitting a machine to which such legs are attached to have a small profile so that it can maneuver in areas that are as small as a human being can maneuver in.

Briefly, a leg mechanism for a walking machine constructed in accordance with the teachings of the present invention comprises a frame member, a first elongate link, a first end of the first link being pivotally connected to the frame member, a pair of second elongate links, first ends of the second links being pivotally connected to a second end of the first link, on opposite sides thereof, to permit positioning of the first link between the second links, second ends of the second links being interconnected to form a foot, a pair of third elongate links, first ends of the third links being pivotally connected to the frame member and the first end of the first link, with the first link between the third links, a pair of fourth elongate links, first ends of the fourth links being pivotally connected to second ends of the third links with the third links between the fourth links, second ends of the fourth links being pivotally connected to an intermediate point on the second links, with the second links between the fourth links, to permit positioning of the second links between the fourth links, a pair of actuator struts, first ends of the struts being pivotally connected to the fourth links, with the fourth links between the struts to permit positioning of the fourth links between the struts, and leg drive means connected to the frame member and to second ends of the actuator struts.

OBJECTS, FEATURES AND ADVANTAGES

It is, therefore, the object of the present invention to solve the problems associated with providing a walking machine with a narrow profile. It is a feature of the present invention to solve these problems by providing a leg mechanism for a walking machine including a plurality of links arranged in a pantograph mechanism, which links are able to fold past each other so that the legs can tuck in close to the body of a walking machine. An advantage to be derived is a compact leg mechanism for a walking machine. Another advantage is a leg mechanism for a walking machine which can tuck in close to a walking machine body.

Still other objects, features and attendant advantages of the present invention will become apparent to those skilled in the art from a reading of the following detailed description of the preferred embodiment constructed in accordance therewith taken in conjunction with the accompanying drawings wherein like numerals designate like parts in the several figures and wherein:

BRIEF DESCRIPTION OF THE DRAWINGS

FIGS. 2, 3 and 4 are sectional views taken along the lines 2—2, 3—3 and 4—4, respectively, in FIG. 1;

FIGS. 5 and 6 are additional side elevation views of the mechanism of FIG. 1 in different positions thereof;

FIG. 7 is a front elevation view of the leg mechanism in the tucked position; and FIG. 8 is a rear elevation view taken in the direction of line 8—8 in FIG. 1.

DESCRIPTION OF THE PREFERRED EMBODIMENT

Figure 1:
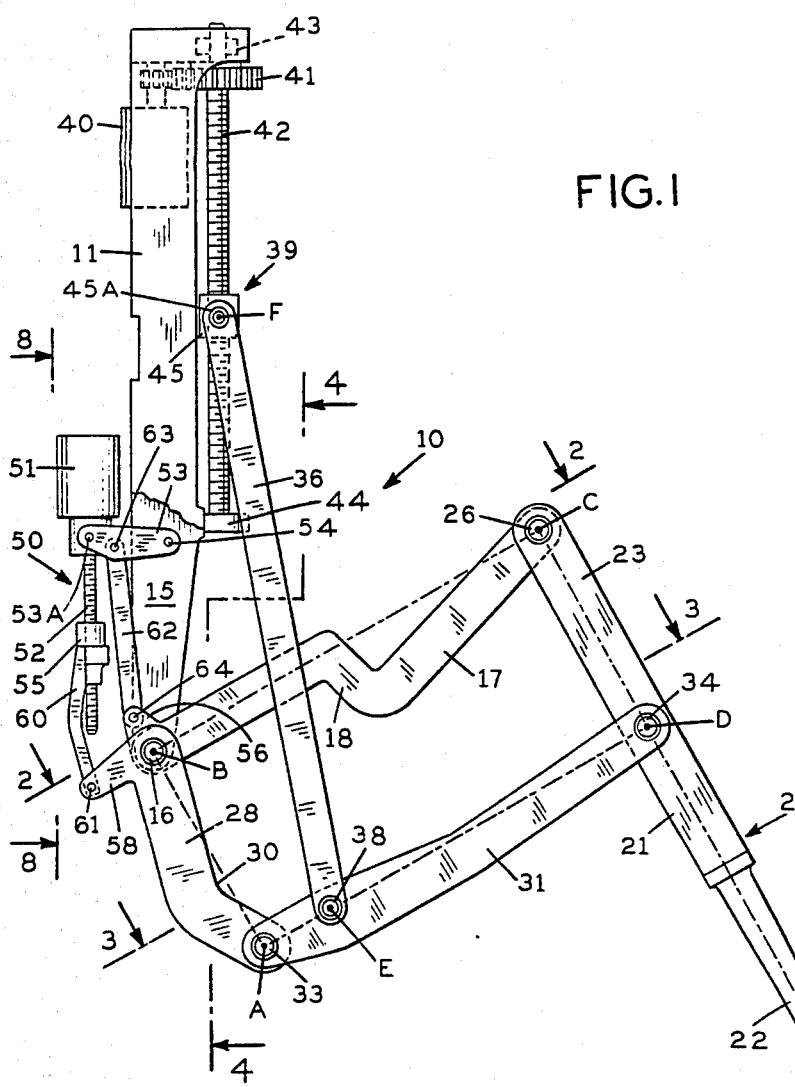
FIG. 1 is a side elevation view of a leg mechanism constructed in accordance with the teachings of the present invention.
Figure 2:
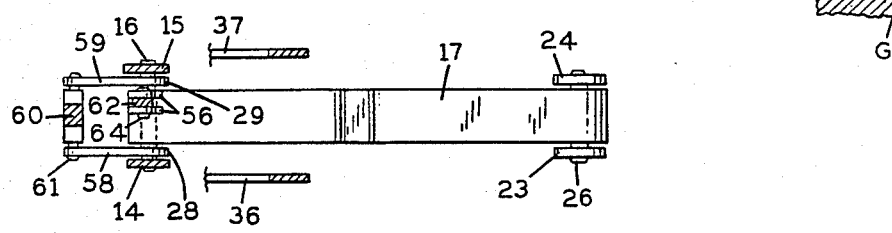

Referring now to the drawings and, more particularly, to FIGS. 1, 2, 3, 4 and 7 thereof, there is shown a leg mechanism, generally designated 10, for a walking machine. Reference should be had to the before-mentioned copending application Ser. No. 476,629 for a more complete description of the manner in which leg mechanism 10 may be combined with a plurality of additional and identical leg mechanisms and attached to a body for forming a complete walking machine. However, the construction of a complete walking machine is not directly relevant to the present invention, which is only directed to a foldable leg mechanism for a walking machine which permits the leg mechanism to occupy a very small area, if desired.

Leg mechanism 10 includes an elongate, upright leg frame 11 which is adapted to be connected to a walking machine body (not shown) in a manner (not shown) which will permit pivotal movement of leg frame 11. Leg frame 11 has a pair of opposed, spaced, parallel sides 14 and 15. A pin 16 extends between sides 14 and 15, at the lower end of leg frame 11.

Leg mechanism 10 includes a plurality of elongate links arranged in a parallelogram to form a pantograph mechanism whereby forces applied at selected points on individual ones of the links can be transmitted to another link which forms the movable foot of the mechanism. More specifically, leg mechanism 10 includes a first elongate link 17 which may be viewed as forming the thigh of leg mechanism 10. Link 17 is a solid member having a dog leg, as shown at 18, for reasons which will appear more fully hereinafter. Pin 16 extends through a first end of thigh 17 so as to pivotally connect thigh 17 to leg frame 11.

Leg mechanism 10 includes a second elongate link, generally designated 20, which forms the shin of leg mechanism 10. Link 20 is preferably made in two parts, an upper part 21 and a lower part 22, which are connected together in any suitable manner. Part 21 is a generally U-shaped member in that the upper portion thereof includes a pair of opposed, parallel sides 23 and 24, and the lower portion is a solid member, as shown at 25. First ends of sides 23 and 24 and the second end of link 17 are pivotally connected to each other by means of a pin 26. Sides 23 and 24 are positioned on opposite sides of the second end of link 17, as shown most clearly in FIGS. 2 and 7. This permits positioning of link 17 between sides 23 and 24 of link 20. It should also be noted that the lower end of part 22 of link 20 forms the foot 27 of leg mechanism 10, which foot 27 may conveniently be provided with a rubber cap 27'.

Leg mechanism 10 includes a pair of third elongate links 28 and 29, first ends of links 28 and 29 being pivotally connected to frame member 11, preferably by means of pin 16. According to the preferred embodiment of the invention, link 17 is positioned between links 28 and 29. Links 28 and 29 have a slight dog leg, as shown at 30 in FIG. 1, for reasons which will appear more fully hereinafter.

The fourth side of the parallelogram is formed by a pair of elongate links 31 and 32, first ends of links 31 and 32 being pivotally connected to second ends of links 28 and 29, be means of a pin 33, with both of links 28 and 29 positioned between links 31 and 32. Second ends of links 31 and 32 are pivotally connected to an intermediate point on link 20, specifically part 21 of link 20, with part 21 of link 20 between links 31 and 32. So as to permit link 17 to pass between sides 23 and 24 of link 20, link 31 is connected to side 23 by a pin 34 and link 32 is connected to side 24 by a separate pin 35.

It will be readily appreciated by those skilled in the art, from an inspection of FIG. 1, that the arrangement of the links just described forms a pantograph mechanism with the various links formed into a parallelogram, the corners of which are defined by the letters A, B, C and D. The parallel sides of the parallelogram are shown by dotted lines. Point B, defined by pin 16, is the fixed point on the pantograph whereas foot 27 is the ultimate movable member thereof.

Vertical movement of foot 27 is controlled by a pair of actuator struts 36 and 37, first ends of struts 36 and 37 being pivotally connected to an intermediate point E on links 31 and 32, with links 31 and 32 positioned between struts 36 and 37. A single pin 38 extends between struts 36 and 37, through links 31 and 32. The second ends of struts 36 and 37 are connected to and part of a leg actuator mechanism, generally designated 39, which is connected to leg frame 11.

More specifically, leg actuator mechanism 39 includes a motor 40 connected by means of suitable gearing 41 to a lead screw 42 which is mounted for rotation in leg frame 11 by a pair of bearings 43 and 44. A drive nut 45 is mounted on lead screw 42 so that drive nut 45 is driven vertically, either up or down, by rotation of lead screw 42. The second ends of struts 36 and 37 are pivotally connected to drive nut 45 by means of pins 45A and 45B, respectively.

While not a part of the present invention, leg mechanism 10 also includes a leg actuator mechanism, generally designated 50, for driving foot 27 horizontally. Leg actuator mechanism 50 includes a motor 51 which directly drives a lead screw 52. Motor 51 is pivotally mounted on one end of a U-shaped rocker arm 53 by means of a pair of pins 53A and 53B. The other end of rocker arm 53 is connected by means of a pin 54 between sides 14 and 15 of leg frame 11. Riding on lead screw 52 is a drive nut 55.

Link 17 of leg mechanism 10 incorporates a crank arm 56 made as an integral part thereof and extending approximately perpendicular to the first end thereof, adjacent pin 16. Similarly, links 28 and 29 incorporate crank arms 58 and 59, respectively, made as integral parts thereof and extending approximately perpendicular to the first ends thereof, adjacent pin 16. A link 60 has a first end thereof made integral with drive nut 55 and a second end thereof connected to crank arms 58 and 59 by means of a pin 61. A link 62 has a first end thereof connected to one side of rocker arm 53 by means of a pin 63 and a second end thereof connected to crank arm 56 by means of a pin 64.

For a more complete description of the manner in which leg actuator mechanism 50 controls the horizontal movement of foot 27, reference should be had to copending application Ser. No. 476,566, filed concurrently herewith, entitled Horizontal Actuator Mechanism for the Legs of a Walking Machine, and assigned to Odetics, Inc., the assignee of the present application. For a more complete description of the manner in which leg actuator mechanism 39 controls the vertical movement of foot 27, reference should be had to copending application Ser. No. 476,583.

Figure 5:
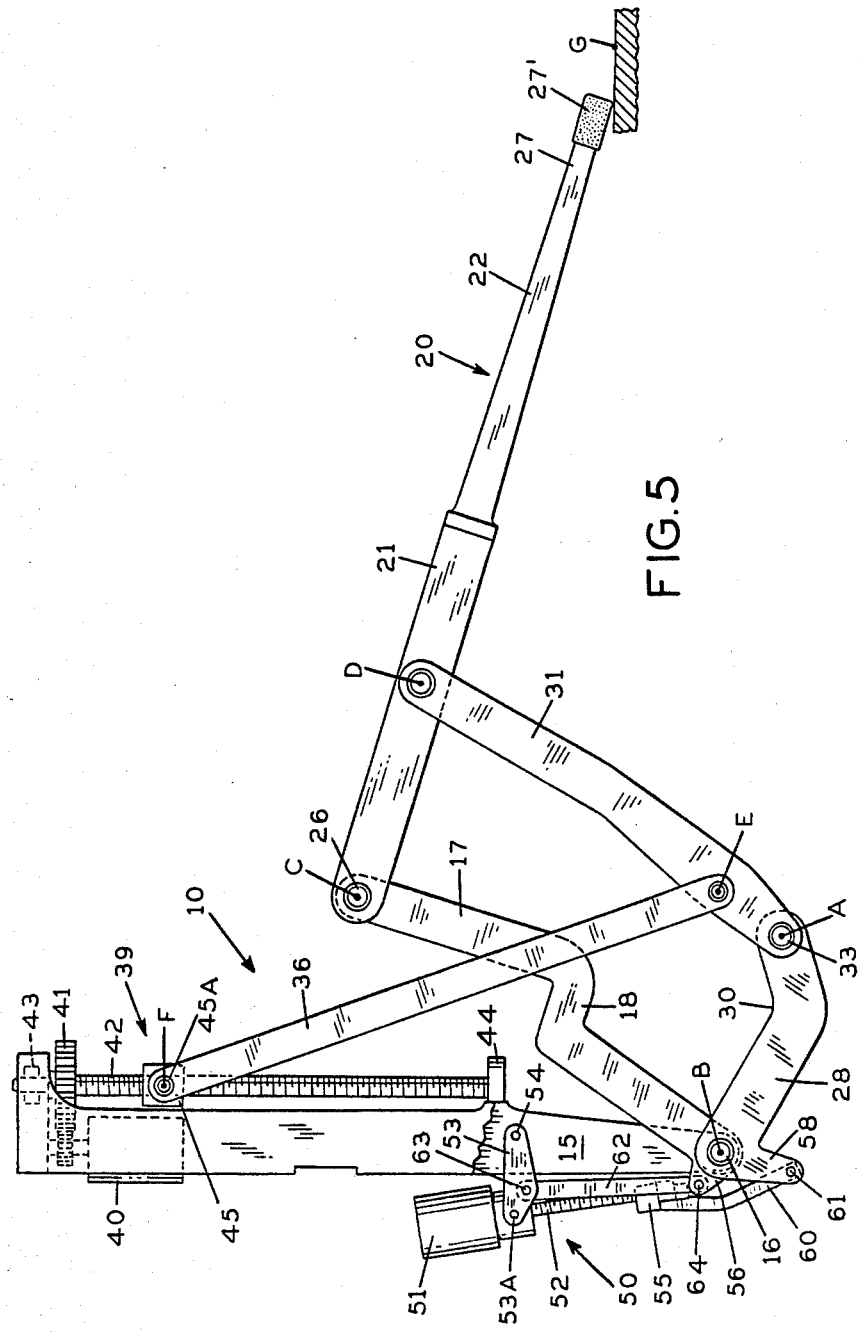

In operation, FIG. 1 shows leg mechanism 10 in one position thereof. FIG. 5 shows the manner in which foot 27 can be both elevated and significantly extended. The advantages of the present invention can be seen most clearly when considering FIGS. 6 and 7 which show the tucked position of leg mechanism 10. It is readily seen from an examination of FIGS. 6 and 7 that the space between sides 23 and 24 of link 20 permits link 17 to extend therebetween so that link 20 is virtually parallel to link 17. Furthermore, since the inside link 17 must be able to pull in quite close to leg drive means 39, dog leg 18 is provided so that the half of link 17 between dog leg 18 and pin 16 can tuck in under bearing 44. Dog leg 18 then extends the remaining portion of link 17, between dog leg 18 and pin 26, in front of lead screw 42 so that this portion of link 17 extends vertically upwardly in front of bearing 44 and lead screw 42.

Link 20 of leg mechanism 10 must be able to pull in almost parallel to link 17 so the upper portion thereof is formed having sides 23 and 24, between which the end of link 17, between dog leg 18 and pin 26, can extend.

Links 31 and 32 have been mounted to the outside of link 17 and link 20 so that when leg mechanism 10 is in the tucked position, links 17, 20, 31 and 32 can all readily pass each other and occupy the same space.

Links 28 and 29 have been positioned on the inside of links 31 and 32 to permit links 28 and 29 to be positioned between links 31 and 32 in the tucked position of leg mechanism 10. The dog leg 30 in links 28 and 29 is to provide clearance for pin 38 which interconnects struts 36 and 37 to links 31 and 32. Because of the force exerted between struts 36 and 37 and links 31 and 32, it is necessary for pin 38 to be a solid member and to extend across the entire gap between struts 36 and 37. Dog leg 30 in links 28 and 29 receive pin 38 in the tucked position of leg mechanism 10. It should also be noted that struts 36 and 37 are mounted to the outsides of links 31 and 32 so that they, too, occupy virtually the same space with the remaining links in the tucked position of leg mechanism 10.

While the invention has been described with respect to the preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

I claim:

1. A leg mechanism for a walking machine comprising:
    a frame member;
    a first elongate link, a first end of said first link being pivotally connected to said frame member;
    a pair of second elongate links, first ends of said links being pivotally connected to a second end of said first link, on opposite sides thereof, to permit positioning of said first link between said second links, second ends of said second links being interconnected to form a foot;
    a pair of third elongate links, first ends of said third links being pivotally conntected to said frame member and said first end of said first link, with said first link between said third links; and
    a pair of fourth elongate links, first ends of said fourth links being pivotally connected to second ends of said third links with said third links between said fourth links, second ends of said fourth links being pivotally connected to an intermediate point on said second links, with said second links between said fourth links, to permit positioning of said second links between said fourth links.

2. A leg mechanism according to claim 1, further comprising:
    a vertical actuator means operatively connected to said fourth links.

3. A leg mechanism according to claim 2, wherein said vertical actuator means comprises:
    a pair of actuator struts, first ends of said struts being pivotally connected to said fourth links, with said fourth links between said struts, to permit positioning of said fourth links between said struts; and
    leg drive means connected to said frame member and to second ends of said actuator struts.

4. A leg mechanism according to claim 3, wherein said leg drive means comprises:
    a motor;
    a lead screw driven by said motor;
    means for connecting said lead screw to said frame member for rotation thereof about a vertical axis; and
    a drive nut on said lead screw connected to said second ends of said actuator struts.

5. A leg mechanism according to claim 4, wherein said leg drive means further comprises:
    upper and lower bearings for supporting said lead screw relative to said frame member; and wherein said first link has a dog leg therein so that a portion of said first link, between said dog leg and said first end thereof, can extend below said lower bearing, the remaining portion of said first link, from said dog leg to said second end thereof, extending in front of said lead screw.

6. A leg mechanism according to claim 3, further comprising:
    a pin extending between said first ends of said actuator struts, through said fourth links; and wherein said third links have a dog leg therein to provide clearance for said pin in a tucked position of said leg mechanism.

* * * * *